US009361615B1

(12) United States Patent
Clemence et al.

(10) Patent No.: US 9,361,615 B1
(45) Date of Patent: Jun. 7, 2016

(54) SYSTEM AND METHOD FOR IN-STORE ACTIVATION OF CREDIT CARDS

(71) Applicant: Valero Services, Inc., San Antonio, TX (US)

(72) Inventors: Christopher Max Clemence, Amarillo, TX (US); Craig Sperry, Canyon, TX (US); Teresa Jo Prock, Amarillo, TX (US); RaLynda Elaine Christie, Amarillo, TX (US); Loretta Jeanne Chandler, Amarillo, TX (US); Marvin Elton Burns, San Antonio, TX (US); Loyd Dane Williams, Amarillo, TX (US); Anne Porter, Monument, CO (US)

(73) Assignee: Valero Services, Inc., San Antonio, TX (US)

( * ) Notice: Subject to any disclaimer, the term of this patent is extended or adjusted under 35 U.S.C. 154(b) by 0 days.

(21) Appl. No.: 14/750,533

(22) Filed: Jun. 25, 2015

(51) Int. Cl.
*G06K 5/00* (2006.01)
*G06Q 20/34* (2012.01)
*G06Q 20/24* (2012.01)

(52) U.S. Cl.
CPC .............. *G06Q 20/354* (2013.01); *G06Q 20/24* (2013.01)

(58) Field of Classification Search
CPC ....... G06Q 20/24; G06Q 20/354; G06Q 40/00
USPC ........................................................ 235/380
See application file for complete search history.

(56) References Cited

U.S. PATENT DOCUMENTS

| 2013/0166441 | A1* | 6/2013 | Kobylkin | G06Q 20/354 705/39 |
| 2014/0061299 | A1* | 3/2014 | Scipioni | G06Q 20/354 235/380 |

* cited by examiner

*Primary Examiner* — Seung Lee
(74) *Attorney, Agent, or Firm* — Bushman Werner, P.C.

(57) ABSTRACT

A system and method provide for secure activation of physical credit cards from a display provided at a store. Temporary spending cards (TSP) for use as credit cards are provided in tamper evident packages found in the display. The TSPs are initially inactivated. Upon removal of the TSP from the package, a user may scan the QR code on the TSP to direct the user's mobile device to a secure location that prompts the user for credit related information. A credit card system evaluates the information using business rules to determine whether or not to approve the user for activation. If approved, then the user is prompted to enter a serial number found on the card to allow immediate spending. The serial number is different from an account number for the card. The TSP expires within a predetermined relatively short time period.

10 Claims, 2 Drawing Sheets

SYSTEM AND METHOD FOR IN-STORE ACTIVATION OF CREDIT CARDS

BACKGROUND OF THE INVENTION

1. Field of the Invention

The present invention relates generally to credit card issuing systems and, more specifically, to a credit card system with physical, temporary shopping pass (TSP) cards located in sealed packages at a store that can be immediately and securely activated at the store.

2. Background of the Invention

Generally, if a credit card application is approved, a credit card is sent by mail. The time lag can be problematic if time is of the essence. For example, if a consumer wants to apply or an existing customer has lost their card and either one wants to make a purchase immediately, filling out a credit card application does not provide help when needed due to the need to wait to receive a credit card in the mail. Dedicated electronic devices have been utilized at stores to activate credit cards but are not user friendly to use and accordingly have only found very limited acceptance.

U.S. Pat. No. 7,896,237 provides actual but inactive credit cards that can be activated at the store. However, there are numerous security problems with this system that could allow fraudulent use of the cards. For example, by copying the actual card numbers, and waiting a period of time until the actual customer activates, the card numbers can be used fraudulently by a third person.

U.S. Pat. No. 7,567,934 teaches providing a temporary number for online use or an actual credit card sent through the mail for limited transactions but does not provide a mechanism to quickly and securely activate a card at a store.

Numerous other prior patents relate to credit card systems but do not address the problems discussed above. Consequently, those skilled in the art will appreciate the present invention.

SUMMARY OF THE INVENTION

A primary object of the present invention is to provide an improved system to provide a credit card by an issuer that can be activated at the store and immediately used to shop/buy.

Another object of the present invention is to provide security systems that prevent credit card fraud even though the unactivated cards may be provided in a display at a store that is available to the public.

These and other objects, features, and advantages of the present invention will become clear from the figures and description given hereinafter. It is understood that the objects listed above are not all inclusive and are only intended to aid in understanding the present invention, not to limit the bounds of the present invention in any way.

In accordance with the disclosure, one embodiment provides a method for enabling in store credit card activation for a user. The method may comprise steps such as providing a display at a store with a plurality of tamper evident packages accessible by the public and providing that the tamper evident packages include therein respective temporary spending passes (TSPS). Other steps may comprise providing that the TSP comprises a serial number thereon that is not the same as a credit card account number with which the TSP is associated. The method may further comprise providing that the TSP comprises a QR code thereon. In one embodiment the method provides that the QR code comprises information that directs a processor with a scanning device to a web location that comprises a credit application. Other steps may comprise providing a credit system programmed to provide approval or disapproval of credit for the user.

The method may further comprise providing that upon approval by the credit system of the issuer that the user is queried whether or not the TSP is in possession of the user. If the TSP is in possession of the user, then upon correctly entering the serial number the TSP is activated for spending for a time period designated by the issuer as temporary, for example, less than four weeks. If the TSP is not in possession of the user then the user is given an option to activate another TSP.

The method may further comprise providing that a plurality of tamper evident packages are also tamper resistant packages.

The method may further comprise providing a telephone number is provided with the tamper evident package which a user can use to associate the TSP with a credit card account of the user.

In another embodiment, a system is provided for enabling in store credit card activation for a user. The system may comprise a display with a plurality of tamper evident packages wherein each package may comprise a TSP. The TSP comprises a serial number thereon that is not the same as a credit card account number and a QR code.

The QR code comprises information that directs a processor with a scanning device to a web location. The web location comprises a credit application that allows the user to enter credit related information.

A credit system is preferably programmed to utilize business rules to provide immediate approval or disapproval of credit for the user. The web location may be provided with programming whereupon approval by the credit system results in the user being queried whether or not the TSP is in possession of the user. If the TSP is in possession of the user, then upon correctly entering the serial number the TSP is activated for spending for a time period, designated by the issuer as temporary, for example, less than four weeks.

The system may allow the user to activate another TSP with another serial number if the original TSP is not in the possession of the user.

The system may further comprise means for associating the TSP with a credit card account of the user by use of the Internet, phone call with customer representative, mobile phone application or the like.

BRIEF DESCRIPTION OF THE DRAWINGS

The above general description and the following detailed description are merely illustrative of the generic invention, and additional modes, advantages, and particulars of this invention will be readily suggested to those skilled in the art without departing from the spirit and scope of the invention. A more complete understanding of the invention and many of the attendant advantages thereto will be readily appreciated by reference to the following detailed description when considered in conjunction with the accompanying drawings, wherein like reference numerals refer to like parts and wherein.

DETAILED DESCRIPTION OF THE PREFERRED EMBODIMENT

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
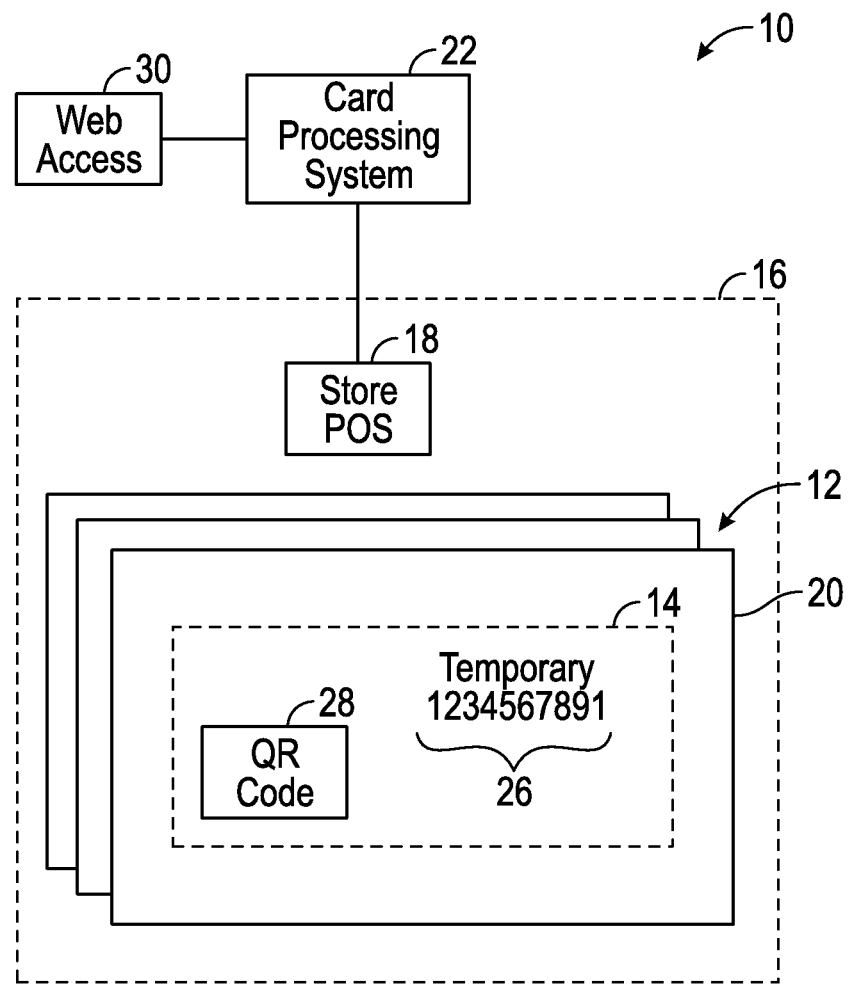
FIG. 1 is an elevational view, partially in hidden lines, schematically showing packets of temporary shopping/spending passes (TSP) in accord with one possible embodiment of the present invention.

Referring now to the drawings and more particularly to FIG. 1 there is shown retail system 10 comprising a display 12 with a plurality of tamper evident and/or tamper resistant packages 20 within a store 16. Display 12 may typically be available to the public but could be under the glass or the like. Stores such as store 16 may comprise a gas station, grocery store, kiosk or the like. The store 16 may comprise a point of sale (POS) device 18 such as a cash register that connects to credit card processing system 22 that may typically be located offsite and internet access 30 for the processing system.

Each tamper resistant and/or tamper evident package 20 contains a temporary spending/shopping pass (TSP) 14. TSP 14 can be used temporarily as though it were an actual credit card. Displays 12 are provided at stores, gas stations, kiosks or the like where customers who need credit may be provided with instant but temporary use of TSP 14, which looks like and acts like a credit card. Enhanced security features as discussed herein allow the relatively safe dispensing of TSP 14 in manner that is intuitive and easy for customers to activate in various ways.

The tamper resistant and/or tamper evident package 20 is preferably sufficiently visually opaque and/or electromagnetically shielded to prevent external access to the information in package 20 and especially the information on TSP 14, because display 12 may be exposed to the public for convenience of the user.

By tamper resistant it is meant the package contents are difficult to access either visually, electromagnetically, and/or physically to obtain information on the TSP 14. By tamper evident, it is meant that it would be difficult to open package 20 and then reseal it without an indication that package 20 had been tampered with.

Tamper evident protection may be accomplished in various ways. For example, tamper evident packaging may be comprised of aluminum foil that once torn is difficult to put back into new condition. Fibrous material covered skin packaging is not easily put back together. In other words, a barrier of some type may be used with an indicator to show the package has been opened. As well, foil or the like may encase TSP 14 so that it becomes relatively easy to see the package has been tampered with while TSP 14 is protected. Further, there may be electrical shielding or the like to prevent access to computer chips or magnetic strips which store information for TSP 14. At a minimum, tamper evident packaging and visual and electromagnetic shielding is desirable so that a user would most likely be readily aware that the package had been tampered with and that it is not desirable to use that particular TSP. Warnings are preferably provided in the package instructions not to use a package that has been tampered with.

As one example of tamper resistance and tamper evident packaging, a clear plastic package accessible with shears could be used with internal foil covering the TSP that provides an internal barrier that shields the TSP 14 from visual or electromagnetic access.

As another example, opaque plastic cases with metallic material may be used to cover TSP 14 that have to be cut open to obtain access to TSP 14 and/or other materials found in the package.

Additional security is preferably provided by the numbering utilized on TSP 14. While TSP 14 may be embodied in different ways, in one embodiment an actual account number and card number fields are combined to form a 14 digit sequence number (plus a check digit), which results in a 15 digit number. The sequence numbers can be generated randomly to ensure that there is no predictable sequence for the TSPs 14 when they are deployed into the field. TSP serial numbers can be stored and managed in credit card processing system 22. The account number is not utilized on the card so that this information is not readily available.

The 14 digit sequence/serial number can be encoded using an algorithm which translates the 14 digit number into a 10 character serial number. The 10 character serial number, shown as item 26 in FIG. 1, could then be printed on the front of each TSP.

Each TSP can be associated with a specific set of terms to ensure the user has the most current set of terms as part of the linking and activation process. If desired, there is a capability to direct "special offers/promotions" to individual or groups of dealer locations by tagging the TSP with promo codes. If desired, TSP could be re-scanned and re-used in some circumstances (the packet is un-opened and has not been previously activated [i.e. the prior applicant was declined])

To mitigate fraud such as "gift card" issues which has been problematic to users in the past, the TSPs 14 are preferably encoded with a widely dispersed series of random numbers. This prevents potential fraudsters from duplicating large numbers of TSPs without physically scanning each card. In one embodiment, less than 1 million TSPs out of a possible 99 trillion are created. Zip codes can be used as an additional step to prevent fraud.

When TSP 14 is activated, it is associated with a standard credit card account. Therefore, when someone calls requesting help with a TSP normal support follows standard procedures.

Another problem avoided utilizing the tamper evident and/or tamper resistant packaging to cover QR code 28, the purpose of which is discussed hereinafter, is that of criminals trying to replace/overlay our QR codes. Criminals try to implant false QR codes to (1) redirect users to a fraudulent website that emulates the application in order to capture personal information, or (2) to direct people to nefarious sites that infect the applicants' device with malware. Enclosing TSP 14 in a sealed envelope will make it harder for criminals to tamper with the QR code without evidence of the tampering.

In one embodiment, a TSP can be linked to an existing credit card account. Thus, a person who does not have their card can purchase items as necessary. For example, perhaps the husband, wife, or child of a credit card holder does not have a card for some reason and needs gas to complete their trip can obtain the TSP for immediate purchase. Linking allows customer support to manage the new TSP just like any other card on the customer's account.

In one embodiment, an internet application process or mobile internet application can be used to accept, validate, and activate TSP cards.

If desired, there may be a capability to "turn on" TSP 14 for applicants who are denied credit.

Figure 2:
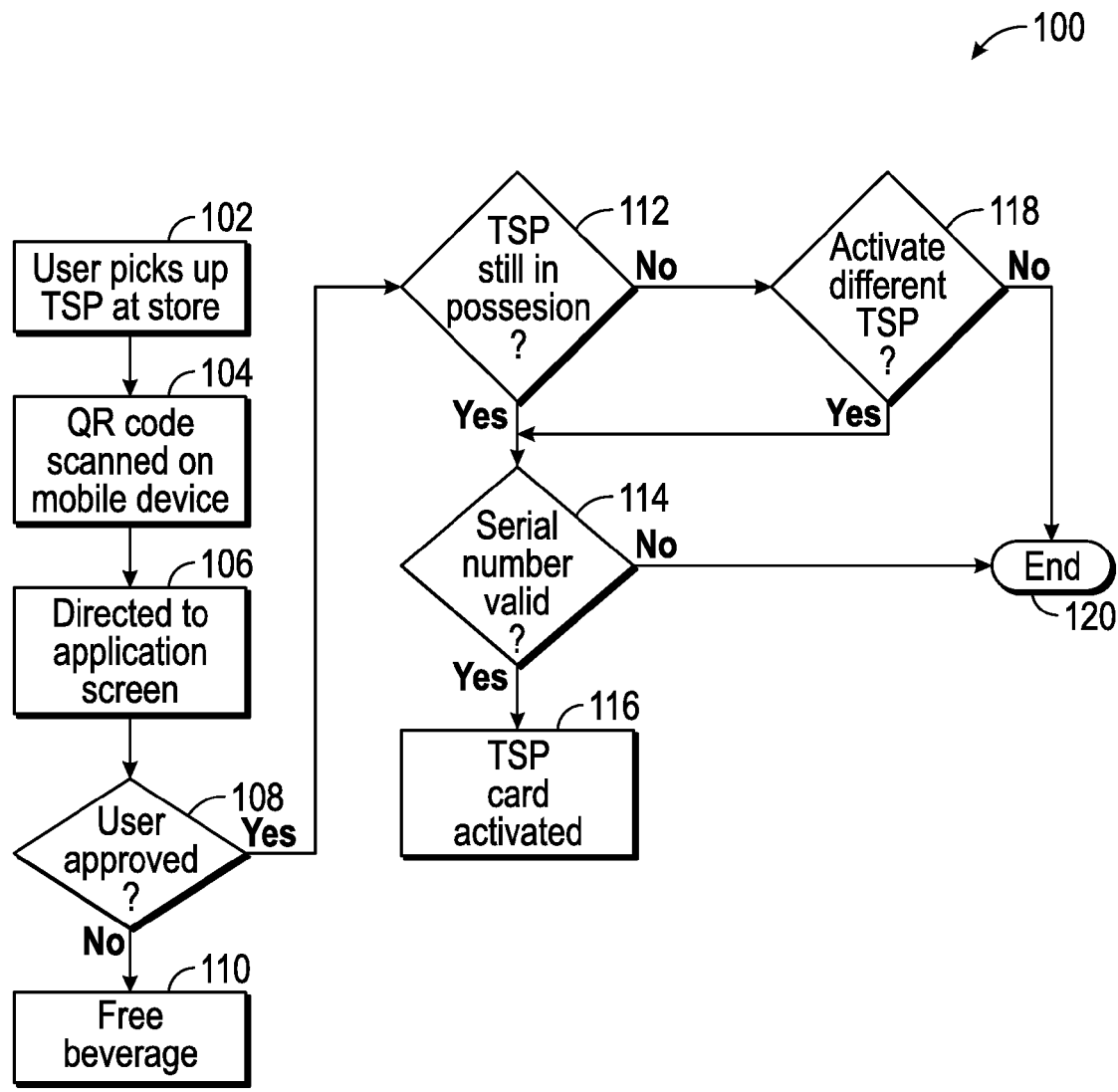
FIG. 2 is a flow chart showing one possible embodiment to obtain an activated TSP utilizing a QR code that initiates and potentially verifies possession of the card for activation purposes in accord with one possible embodiment of the present invention.

Referring now to FIG. 2, there is shown flowchart 100 for activating a TSP packet 20. In one possible embodiment, the user picks up a package 20 with TSP 14 at a store as indicated at 102. A mobile device is utilized to scan QR code 28 from TSP packet 20 as indicated at 104. The QR code directs the user mobile device to an application screen as indicated at 106 whereupon the user enters the necessary information, e.g., driver's license number. Credit card processing system 22 is programmed to decide whether to approve the user credit or not as indicated at 108. If the user is not approved for immediate credit, then a communication of additional time required for processing is produced and/or perhaps a free beverage is provided at 110. If approved, the user may be asked whether TSP 14 is in their possession upon credit approval as indicated at 112. If so, then the user may be asked to input the serial code 26 of FIG. 1 as indicated at 114. If correct, the TSP card is then activated. Since the card is temporary, the card may work for only a designated time as defined by the issuer, e.g. three weeks or so. In the meantime, a new credit card may be mailed if desired. By temporary, in one embodiment this is less than four weeks, in another embodiment temporary is less than three weeks, and in another embodiment temporary is less than two weeks, and in another embodiment temporary is less than one week, and in another embodiment temporary is any other desired time frame which may be more than four weeks.

In another embodiment, the customer may no longer have the TSP in their possession for which they were approved after the customer is notified of credit approval. For example, the customer may have delayed filling in the desired information and lost the TSP. In that case, the customer may be asked if it would be desired to activate a new TSP as indicated at 118. The new serial number 26 is then entered by the user and checked by the system. If correct, the new TSP is activated as indicated at 116 or if not correct then the process may effectively end as indicated at 120.

In another embodiment for activation of the TSP, the TSP packet 20 may comprise a website address. Instead of step 104 utilizing a QR code, the customer utilizes a personal computer to directly browse to a website and essentially follows the same sequence beginning at 106 utilizing the computer instead of the mobile application. If the user enters the data, is approved as indicated at 108, has the TSP in possession as indicated at 112, enters the sequence number as indicated at 114, then the TSP is activated and the user can immediately make purchases.

In another embodiment, the credit card customer calls a telephone number in the TSP packet 20. If the customer has a valid account in good standing and has TSP 14 in their possession, the TSP is immediately activated to make purchases and the TSP is linked to the customer's account.

In summary, a system and method provide for secure activation of physical credit cards from a display provided at a store. Physical TSPs for use as credit cards are provided in tamper evident packages found in the display, which may be openly accessible to the public. The TSPs are initially unactivated. Upon removal of the TSP from the package, a user may scan the QR code on the TSP to direct the user's mobile device to a secure location that prompts the user for credit related information. A credit card system evaluates the information using business rules to determine whether or not to approve the user for credit. If credit is approved, then the user is prompted to enter a sequence number found on the card to allow immediate spending. The sequence number is different from an account number for the card. The TSP expires within a predetermined relatively short time period.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

The invention claimed is:

1. A method for enabling in store credit card activation for a user, comprising:
    providing a display at a store with one or more tamper evident packages comprising a temporary spending pass (TSP);
    providing that said TSP comprises a serial number thereon that is not the same as a credit card account number with which said TSP is associated;
    providing that said TSP comprises a QR code thereon;
    providing that said QR code comprises information that directs a processor with a scanning device to a web location comprising a credit application that allows said user to enter credit related information;
    providing a credit system programmed to provide approval or disapproval of credit for said user by an issuer; and
    providing that upon approval by said credit system by said issuer that said user is queried whether or not said TSP is in possession of said user whereupon if said TSP is in possession of said user then upon correctly entering said serial number said TSP is activated for spending for a time period designated by the issuer.

2. The method of claim 1, further comprising that if said TSP is not in possession of said user then said user is given an option to activate another TSP.

3. The method of claim 1, further comprising providing that said plurality of tamper evident packages are also tamper resistant packages and further are visually and/or electromagnetically shielded.

4. The method of claim 1, further comprising providing a telephone number is provided with said tamper evident package which a user to can utilize to associate said TSP with a credit card account of said user.

5. The method of claim 1 further comprising a website address with said tamper evident package wherein said user can access and utilize said website to associate said TSP with a credit card account of said user.

6. The method of claim 1 further comprising utilizing a fourteen digit sequence number to produce said serial number, which is a ten digit number.

7. A system for enabling in store credit card activation for a user, comprising:
    a display comprising one or more tamper evident packages each comprising a temporary spending pass (TSP);
    a serial number on said TSP that is not the same as a credit card account number;
    a QR code on said TSP, said QR code comprising information that directs a processor with a scanning device to a web location with a credit application that allows said user to enter credit related information;
    a credit system programmed to provide approval or disapproval of credit for said user by an issuer;
    said web location being provided with programming whereupon approval by said credit system by said issuer that said user is queried whether or not said TSP is in possession of said user and if said TSP is in possession of said user then upon correctly entering said serial number, then said TSP is activated for spending for a time period designated by the issuer.

8. The system of claim 7, wherein if said TSP is not in possession of said user then said user is given an option to activate another TSP.

9. The system of claim 7, wherein said plurality of tamper evident packages also comprise tamper resistant packages.

10. The system of claim 7, further comprising said tamper evident package comprising means for associating said TSP with a credit card account of said user.

\* \* \* \* \*